(12) United States Patent
Grayson et al.

(10) Patent No.: US 8,891,373 B2
(45) Date of Patent: Nov. 18, 2014

(54) SYSTEM AND METHOD FOR SYNCHRONIZING QUALITY OF SERVICE IN A WIRELESS NETWORK ENVIRONMENT

(75) Inventors: Mark Grayson, Maidenhead (GB); Rajesh S. Pazhyannur, Sunnyvale, CA (US); Kevin D. Shatzkamer, Hingham, MA (US)

(73) Assignee: Cisco Technology, Inc., San Jose, CA (US)

( * ) Notice: Subject to any disclaimer, the term of this patent is extended or adjusted under 35 U.S.C. 154(b) by 311 days.

(21) Appl. No.: 13/027,970

(22) Filed: Feb. 15, 2011

(65) Prior Publication Data

US 2012/0207022 A1     Aug. 16, 2012

(51) Int. Cl.
*H04L 12/26* (2006.01)
*H04W 24/08* (2009.01)

(52) U.S. Cl.
CPC ......... *H04L 43/0811* (2013.01); *H04L 43/0894* (2013.01); *H04W 24/08* (2013.01)
USPC ............ 370/235; 370/328; 370/401; 370/468

(58) Field of Classification Search
None
See application file for complete search history.

(56) References Cited

U.S. PATENT DOCUMENTS

| | | |
|---|---|---|
| 6,822,940 B1 | 11/2004 | Zavalkovsky et al. |
| 6,889,050 B1 | 5/2005 | Willars et al. |
| 7,215,667 B1 | 5/2007 | Davis |
| 8,000,242 B2 | 8/2011 | Wang et al. |
| 8,254,382 B1 | 8/2012 | Wu et al. |
| 8,355,413 B2 | 1/2013 | Vasamsetti et al. |
| 8,358,593 B2 | 1/2013 | Eipe et al. |
| 8,391,152 B2 | 3/2013 | Briscoe et al. |
| 8,493,860 B2 | 7/2013 | Racz et al. |
| 2003/0058862 A1 | 3/2003 | Lansing et al. |
| 2003/0103458 A1 | 6/2003 | Shin |
| 2004/0052212 A1 | 3/2004 | Baillargeon |
| 2004/0114519 A1* | 6/2004 | MacIsaac ...................... 370/232 |
| 2005/0041584 A1 | 2/2005 | Lau et al. |
| 2005/0138418 A1 | 6/2005 | Spry et al. |
| 2005/0159167 A1 | 7/2005 | Hakalin et al. |
| 2006/0159016 A1 | 7/2006 | Sagfors et al. |
| 2007/0064684 A1* | 3/2007 | Kottilingal ................... 370/355 |
| 2007/0105549 A1* | 5/2007 | Suda et al. ................. 455/426.2 |
| 2007/0189268 A1* | 8/2007 | Mitra et al. ................... 370/352 |
| 2008/0008093 A1 | 1/2008 | Wang et al. |
| 2008/0049787 A1* | 2/2008 | McNaughton et al. ....... 370/468 |
| 2008/0144496 A1 | 6/2008 | Bachmutsky |
| 2008/0144502 A1 | 6/2008 | Jackowski et al. |
| 2009/0268684 A1 | 10/2009 | Lott et al. |
| 2009/0296599 A1 | 12/2009 | Ayyagari et al. |

(Continued)

OTHER PUBLICATIONS

U.S. Appl. No. 13/027,999, filed Feb. 15, 2011, entitled "System and Method for Managing Tracking Area Identity Lists in a Mobile Network Environment," Inventors: Vinod K. Kamalaraj, et al.

(Continued)

*Primary Examiner* — Chi Pham
*Assistant Examiner* — Shick Hom
(74) *Attorney, Agent, or Firm* — Patent Capital Group

(57) ABSTRACT

A method is provided in one example embodiment and includes receiving a plurality of status signals, for a plurality of radio links, at a microwave device; detecting a bandwidth anomaly based on the status signals; and communicating a quality of service (QoS) control signal, which is based on the bandwidth anomaly, to a gateway coupled to at least one of the radio links.

18 Claims, 5 Drawing Sheets

(56) References Cited

U.S. PATENT DOCUMENTS

| | | | |
|---|---|---|---|
| 2010/0002722 A1* | 1/2010 | Porat et al. | 370/467 |
| 2010/0246432 A1* | 9/2010 | Zhang et al. | 370/252 |
| 2010/0322141 A1* | 12/2010 | Liu et al. | 370/315 |
| 2011/0026453 A1 | 2/2011 | Yan | |
| 2011/0098031 A1 | 4/2011 | Dakshayani et al. | |
| 2011/0098051 A1 | 4/2011 | Kamalaraj et al. | |
| 2011/0110286 A1 | 5/2011 | Lu et al. | |
| 2011/0111767 A1 | 5/2011 | Livanos | 455/452.2 |
| 2011/0117931 A1 | 5/2011 | Hu et al. | |
| 2011/0141884 A1 | 6/2011 | Olsson et al. | |
| 2011/0235528 A1 | 9/2011 | Racz et al. | |
| 2011/0292870 A1 | 12/2011 | Nagpal et al. | |
| 2012/0026884 A1 | 2/2012 | Sundell et al. | |
| 2012/0047273 A1 | 2/2012 | Ajero et al. | |
| 2012/0269064 A1 | 10/2012 | Strasman | |
| 2013/0103833 A1 | 4/2013 | Ringland et al. | |

OTHER PUBLICATIONS

U.S. Appl. No. 13/104,788, filed May 10, 2011, entitled "System and Method for Integrated Quality of Service in a Wireless Network Environment," Inventors: Kevin D. Shatzkamer, et al.

U.S. Appl. No. 13/179,537, filed Jul. 10, 2011, entitled "System and Method for Subscriber Mobility in a Cable Network Environment," Inventors: Kevin D. Shatzkamer, et al.

U.S. Appl. No. 13/591,069, filed Aug. 21, 2012, entitled "Providing Integrated End-to-End Architecture That Includes Quality of Service Transport for Tunneled Traffic," Inventors: Mark Grayson, et al.

USPTO Jan. 24, 2013 Non-Final Office Action from U.S. Appl. No. 13/104,788.

O'Dell, Mike, "8+8—An Alternate Addressing Architecture for IPv6," Network Working Group Internet Draft <draft-odell-8+8-00.txt> UUNET Technologies, Oct. 22, 1996, 21 pages.

Subharthi, Paul, et al., "A Vision of the Next Generation Internet: A Policy Oriented Perspective," Proceedings of British Computer Society (BCS) International Conference on Visions of Computer Science, Imperial College, Long, Sep. 22-24, 2008, 12 pages.

Zorn, G., et al., "Radius Attributes for Tunnel Protocol Support," Network Working Group RFC 2868, Jun. 2000, 21 pages.

"Data-over-Cable Service Interface Specifications DOCSIS 3.0; MAC and Upper Layer Protocols Interface Specification," Feb. 15, 2008.

U.S. Appl. No. 13/021,125, filed Feb. 4, 2011, entitled "System and Method for Managing Congestion in a Network Environment," Inventors: Francois L. Le Faucheur, et al.

P. Eardley, "Pre-Congestion Notification (PCN) Architecture," Network Working Group, RFC 5559, Jun. 2009, 51 pages; eprints.eemcs.utwente.nl/15444/01/rfc5559.txt.

Francois Le Faucheur, et al., "RSVP Extensions for Admission Control Over Diffserv Using Pre-Congestion Notification (PCN)," Internet Draft, © The Internet Society (2006), 11 pages; tools.ietf.org/pdf/draft-lefaucheur-rsvp-ecn-01.pdf.

Wayne Cutler, "MSF Whitepaper on Quality of Service (QoS) over the Network-to-Network Interface (NNI)—MSF-TR-Services-006.FINAL," MultiService Forum © 2010, 22 pages.

ETSI, "LTE; General Packet Radio Service (GPRS) enhancements for Evolved Universal Terrestrial Radio Access Network (E-UTRAN) access (3GPP TS 23.401 version 9.6.0 Release 9)," © European Telecommunications Standards Institute 2010; 262 pages.

Kent, et al., "Security Architecture for the Internet Protocol," Network Working Group, IETF RFC 2401; Nov. 1998.

USPTO Jul. 2, 2013 Non-Final Office Action from U.S. Appl. No. 13/027,999.

USPTO Aug. 2, 2013 Response to Jul. 2, 2013 Non-Final Office Action from U.S. Appl. No. 13/027,999.

USPTO Sep. 10, 2013 Notice of Allowance from U.S. Appl. No. 13/027,999.

USPTO Jun. 7, 2013 Final Office Action from U.S. Appl. No. 13/104,788.

USPTO Jun. 18, 2013 Non-Final Office Action from U.S. Appl. No. 13/021,125.

USPTO Jul. 26, 2013 Non-Final Office Action from U.S. Appl. No. 13/179,537.

U.S. Appl. No. 14/058,732, filed Oct. 21, 2013, entitled "System and Method for Managing Tracking Area Identity Lists in a Mobile Network Environment," Inventors: Vinod K. Kamalaraj, et al.

USPTO Aug. 13, 2013 Response to Jun. 18, 2013 Non-Final Office Action from U.S. Appl. No. 13/021,125.

USPTO Oct. 16, 2013 Response to Jul. 26, 2013 Non-Final Office Action from U.S. Appl. No. 13/179,537.

USPTO Feb. 3, 2014 Non-Final Office Action from U.S. Appl. No. 13/179,537.

U.S. Appl. No. 14/159,508, filed Jan. 21, 2014, entitled "System and Method for Managing Congestion in a Network Environment," Inventors: Francois L. Le Faucheur, et al.

USPTO Oct. 24, 2013 Final Office Action from U.S. Appl. No. 13/021,125.

USPTO Jun. 1, 2014 Notice of Allowance from U.S. Appl. No. 13/021,125.

* cited by examiner

SYSTEM AND METHOD FOR SYNCHRONIZING QUALITY OF SERVICE IN A WIRELESS NETWORK ENVIRONMENT

TECHNICAL FIELD

This disclosure relates in general to the field of communications, and more particularly, to a system and a method for synchronizing quality of service in a wireless network environment.

BACKGROUND

Networking architectures have grown increasingly complex in communications environments, particularly mobile wireless environments. Data traffic has grown extensively in recent years, which has significantly increased the demands on radio resources. As the subscriber base of end users increases, efficient management of communication resources and quality of service (QoS) becomes even more critical. QoS management allows mobile service providers to control traffic across the radio interface, the transmission network, and the core network: from the heaviest users or applications. However, neither independent carrier Ethernet QoS mechanisms, nor radio access bearer QoS mechanisms are independently sufficient for reliably and consistently enabling a quality end-user experience. As future applications demand increases in bandwidth, reductions in latency, and stricter QoS requirements, current architectures may not be able to accommodate these parameters. Hence, significant challenges remain for managing network resources, particularly in the context of wireless network QoS.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes receiving a plurality of status signals, for a plurality of radio links, at a microwave device; detecting a bandwidth anomaly based on the status signals; and communicating a quality of service (QoS) control signal, which is based on the bandwidth anomaly, to a gateway coupled to at least one of the radio links. [The gateway could be an access gateway, a serving gateway, a packet data network (PDN) gateway (PGW), an aggregation provider edge (Agg-PE), etc.]

In more specific implementations, at least one of the radio links is an Ethernet microwave backhaul link. Additionally, link rate information can be communicated to a particular network element that serves as a point of attachment (PoA) to an Internet protocol (IP) network. Separately, the status signals can be received using a Metro Ethernet Forum User Network Interface. Also, the QoS control signal can be sent using an Access Node Control Protocol in specific instances of the present disclosure. In other example scenarios, the access gateway is configured to modify the QoS of user equipment supported by the access gateway based on the QoS control signal.

Example Embodiments

Figure 1:
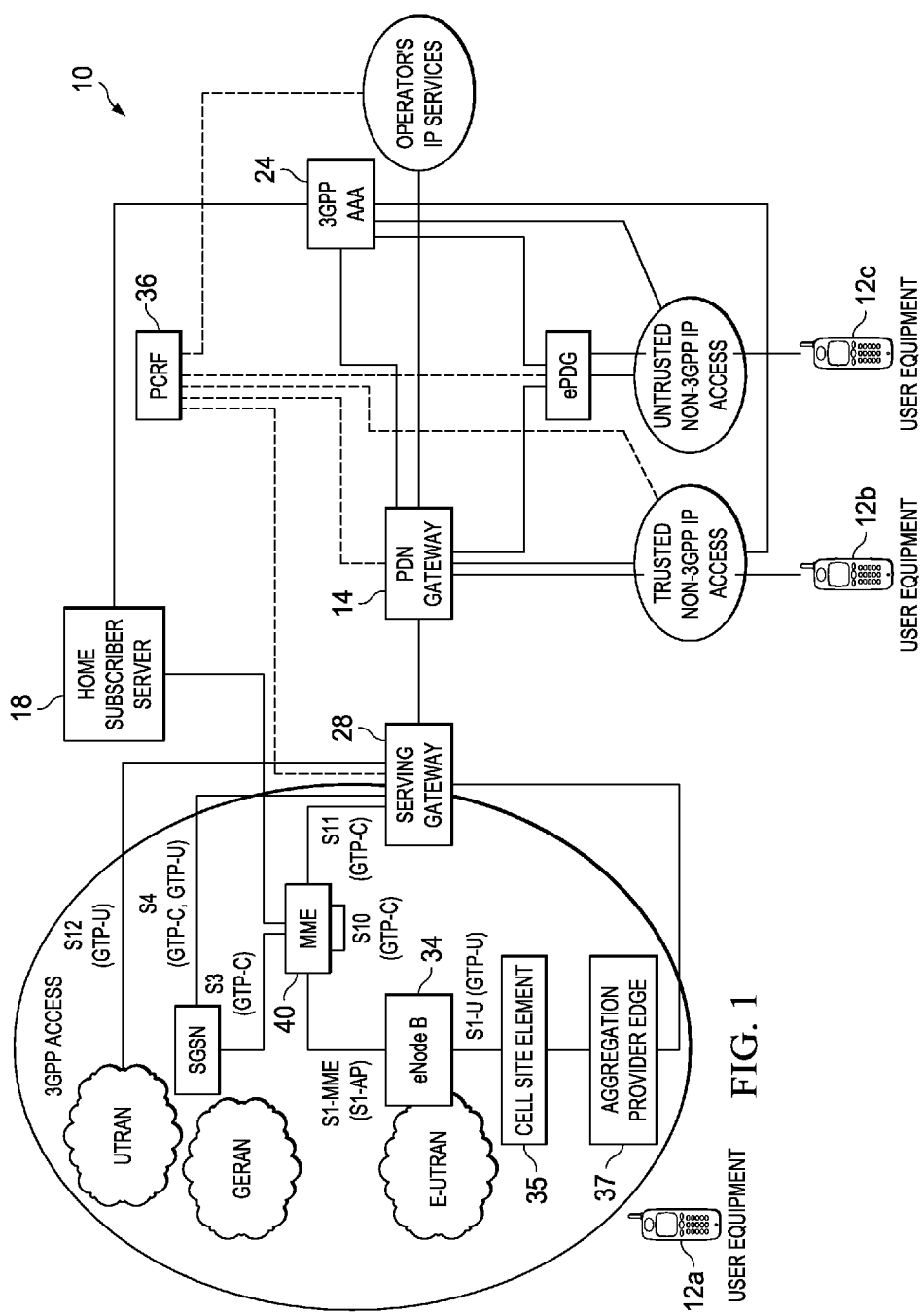
FIG. 1 is a simplified block diagram illustrating a communication system for synchronizing quality of service in a wireless network environment according to one embodiment of the present disclosure.

Turning to FIG. 1, FIG. 1 is a simplified block diagram of a communication system 10 for synchronizing QoS in a network environment. This particular configuration may be tied to the 3rd Generation Partnership Project (3GPP) Evolved Packet System (EPS) architecture, also sometimes referred to as the Long-Term Evolution (LTE) EPS architecture, but alternatively this depicted architecture may be applicable to other environments equally. The example architecture of FIG. 1 includes multiple end users operating user equipment (UE) 12a-c and a packet data network (PDN) gateway (PGW) 14, which has a logical connection to a serving gateway (SGW) 28. Also provided is a home subscriber server (HSS) 18 and an Authentication, Authorization, and Accounting (AAA) element 24. SGW 28 has a logical connection to an eNodeB 34, a cell site element 35, an aggregation provider edge (Agg-PE) 37, and a Mobility Management Entity (MME) 40. Both SGW 28 and PGW 14 can interface with a Policy and Charging Rules Function (PCRF) 36.

Each of the elements of FIG. 1 may couple to one another through simple interfaces (as illustrated) or through any other suitable connection (wired or wireless), which provides a viable pathway for network communications. Additionally, any one or more of these elements may be combined or removed from the architecture based on particular configuration needs. Communication system 10 may include a configuration capable of transmission control protocol/Internet protocol (TCP/IP) communications for the transmission or reception of packets in a network. Communication system 10 may also operate in conjunction with a user datagram protocol/IP (UDP/IP) or any other suitable protocol where appropriate and based on particular needs.

Also provided in the architecture of FIG. 1 is a series of interfaces, which can offer mobility, policy control, AAA functions, and charging activities for various network elements. For example, interfaces can be used to exchange point of attachment, location, and access data for one or more end users. Resource, accounting, location, access network information, network address translation (NAT) control, etc. can be exchanged using a remote authentication dial in user service (RADIUS) protocol, or any other suitable protocol where appropriate. Other protocols to be used in such communications can include Diameter, service gateway interface (SGI), terminal access controller access-control system (TACACS), TACACS+, etc.

There are two access cases represented in FIG. 1, which depicts these as trusted and untrusted non-3GPP IP access. For the trusted scenario, a viable relationship exists between the service provider and the core network. For the untrusted scenario, a suitable security mechanism can be provided to ensure the integrity of the data communications (e.g., encryption and decryption operations can occur in this scenario and, further, involve an evolved packet data gateway (ePDG), which has a logical connection to PCRF 36 as shown in FIG. 1).

In more general terms, 3GPP defines the Evolved Packet System (EPS) as specified in TS 23.401, TS.23.402, TS 23.203, etc. The EPS generally consists of IP access networks and an Evolved Packet Core (EPC). Access networks may be 3GPP access networks, such a GERAN, UTRAN, and E-UTRAN, or they may be non-3GPP IP access networks such as digital subscriber line (DSL), Cable, WiMAX, code division multiple access (CDMA) 2000, WiFi, or the Internet. Non-3GPP IP access networks can be divided into trusted and untrusted segments. Trusted IP access networks support mobility, policy, and AAA interfaces to the EPC, whereas untrusted networks do not. Instead, access from untrusted networks is done via the ePDG, which provides for IPsec security associations to the user equipment over the untrusted IP access network. The ePDG (in turn) supports mobility, policy, and AAA interfaces to the EPC, similar to the trusted IP access networks.

Before detailing the operations and the infrastructure of FIG. 1, certain contextual information is provided to offer an overview of some problems that may be encountered while providing QoS in a wireless network environment. Such information is offered earnestly and for teaching purposes only and, therefore, should not be construed in any way to limit the broad applications for the present disclosure.

In mobile wireless systems, solutions, and standards, QoS can be enforced through a combination of an access gateway (AGW) and eNodeB mechanisms, while in carrier Ethernet systems, solutions, and standards, QoS can be enforced and distributed through various mechanisms that generally assume a consistent experience across adjacent networks. [Note that logistically, the AGW may or may not connect to an MME. In the case of WiMAX, the generic AGW does not connect to the MME. In the case of LTE, the generic AGW (specifically, the SGW) does connect to the MME. The architecture of FIG. 1 is associated with LTE and, as such, the node in this instance is specifically an SGW. The present disclosure has broad applicability to any such networks including WiMAX, high-speed packet access (HSPA), etc., as detailed below.]

For mobile wireless systems, it is generally assumed in 3GPP that the airlink is the only place where congestion can occur and, further, that airlink QoS is sufficient for delivering a quality experience to mobile subscribers. Consequently, few if any requirements may be imposed on the transport domain. Wireless networks can also require a greater degree of control than what Ethernet standards provide because of drastic and unpredictable bandwidth fluctuations on airlinks, link errors, and subscriber mobility, for example. The situation can be further complicated when there is also a wireless link between an eNodeB and an AGW (e.g., an Ethernet microwave backhaul link) because similar bandwidth fluctuations and link errors may also be prevalent.

Hence, transport networks (whether they are time division multiplex (TDM) or Ethernet and regardless of the underlying protocol) impose some level of quality of service. Typically, in the TDM environment, the quality of service model is straightforward; links are either up or down, where the bandwidth is typically on an all-or-nothing basis. An Ethernet environment is more challenging because of multiplex traffic, because traffic is oversubscribed, and because of the resultant shared network paradigm. Performing QoS management in such networks requires a broader understanding of the traffic propagating in the networks, and the quality of the links on which the traffic propagates. Thus, QoS is manageable when there is a broad understanding of the flows (end-to-end); however, in microwave networks this cannot be assumed.

For example, when microwave devices are in the backhaul, sudden changes in conditions may significantly deteriorate network performance. These changes can occur quickly and with high frequency (e.g., weather systems that quickly move into an area and that can impact the refractions of signals). Adaptive modulation allows microwave devices to adjust their bandwidth based on the number of errors being seen on a given link. However, routing devices on either side of the microwave device universally presume that the link speed remains the same. Essentially, there are no signaling or feedback mechanisms present: mechanisms that would engender better network performance.

In accordance with one embodiment, communication system 10 can overcome some of the aforementioned shortcomings (and others) by providing a system and method for aligning and distributing QoS between disparate radio access network (RAN) and transport domains in a wireless system. More particularly, such an embodiment of communication system 10 may provide a correlation of 3GPP/WiMAX Forum QoS class to IP QoS or Ethernet 802.1p value (and vice-versa); discrepancy resolution between available transport QoS and signaled RAN QoS; enforcement/shaping of RAN QoS prior to transmission across a radio link; and Call Admission Control (CAC) for subscribers entering the associated QoS domain (e.g., either roaming subscriber or new session instantiation).

An Agg-PE may receive status signals that provide information about radio links between the RAN and the Agg-PE, such as the bandwidth supported by an Ethernet microwave system using Adaptive Modulation and Coding. The Agg-PE may analyze the status signals to detect bandwidth anomalies in the radio links. A bandwidth anomaly can be any condition that may interfere with desired or anticipated QoS: including congestion or constrained bandwidth. In one example, Metro Ethernet Forum (MEF) User Network Interface-Network side (UNI-N) signaling may be used to allow a radio, such as an Ethernet microwave radio, to signal the Agg-PE device that it is operating using constrained bandwidth (e.g., because of adverse weather conditions). The Agg-PE can then aggregate bandwidth anomalies from multiple radio links into QoS control signals, and send the QoS control signals (including bandwidth information) to an AGW. Note that the term 'QoS control signal' is a broad term that encompasses any type of information that may be relevant to QoS (either at a link level, at a network device level, at a network level more generally, etc.). Hence, any data segment or information relevant to QoS can be sent as a QoS control signal, which can be received (and responded to) in any appropriate fashion at a next destination. The signaling between the Agg-PE and the AGW can use a protocol such as the Access Node Control Protocol (ANCP), or any other suitable protocol or paradigm, which may be based on particular operator needs.

The AGW may then use the QoS information to optionally modify QoS characteristics of subscribers supported by the AGW. For example, the AGW may be operable to determine which subscribers are impacted by congestion on a microwave link to compare the guaranteed bit rate (GBR) bandwidth of those subscribers. If the GBR total bandwidth of such subscribers exceeds the microwave bandwidth, the AGW is then operable to decrease the cumulative GBR bandwidth so that subscribers can receive correct packet handling. For example, the AGW can signal that the GBR service of a subset of subscribers can no longer be supported, for example, by interaction with an external policy server.

In another embodiment, the AGW may operate in a tunnel switch mode, whereby a subscriber's mobility anchor and IP point of attachment (PoA) may be decomposed into separate entities. For example, in an LTE architecture, the mobility anchor is an SGW and the IP PoA is a PGW. In roaming scenarios, the IP PoA may be in a separate network. There may also be multiple PoAs, in which case the AGW can determine how to signal modified QoS to the various IP PoA elements, such as a pro-rata modification. For example, if 100 GBR subscribers are attached to IP PoA (A), 10 GBR subscribers are attached to IP PoA (B), and the microwave Ethernet signaling indicates that GBR flows need to decrease by 10%, then the AGW may be operable to signal 10 GBR subscribers on IP PoA (A) and 1 GBR subscriber on IP PoA (B) to modify their QoS. Other algorithms can also readily be supported, such as using the home public land mobile network (PLMN) operator in a preference algorithm, where one IP PoA is supported above another.

Thus, communication system 10 can provide an end-to-end QoS system that integrates, translates, and correlates mobile-specific airlink QoS mechanisms and transport-specific QoS mechanisms. This can allow the two disparate networks to behave as a single system for the management and enforcement of policies and, further, can enable more efficient QoS models in a mobile wireless system by accounting for backhaul conditions when assigning per-subscriber (or per-flow) QoS. For example, communication system 10 can translate and integrate MEF-specific capabilities and 3GPP/WiMAX Forum approaches to QoS in order to create an end-to-end system.

While certain embodiments may be described herein in terms of an LTE network, the principles illustrated are applicable generally to any wireless network that has some level of QoS enabled on a radio link, including WiMAX and HSPA, for example. Thus, the AGW generally represents the first point of un-tunneled IP traffic in a mobile network. In a WiMAX network, for instance, the AGW may be analogous to the Access Service Network Gateway (ASNGW) or Core Service Network (CSN) Gateway, while in an LTE network, the AGW may be analogous to the serving gateway (SGW) or Packet Gateway (PGW). The Agg-PE represents an aggregation node for the mobile backhaul network (e.g., links between the RAN and EPC), and may be terminating a wide range of interface types, such as Ethernet, Synchronous Optical Network (SONET) (OCx), microwave, etc. An eNodeB, as used herein, represents a radio or mobile node that provides the wireless carrier to subscribers. In WiMAX, for instance, an eNodeB may be represented as a base transceiver station (BTS). A cell site element represents any element that provides the routing, switching, and transport functions at the cell site, which may be integrated with or separate from an eNodeB.

Similarly, since communication system 10 may include a configuration capable of TCP/IP communications, existing IP-based mechanisms for signaling and enforcing QoS may also be used throughout the system. Thus, in a WiMAX radio access domain, for example, communication system 10 may use the R6 interface, which allows for signaling of QoS and policy information between an ASNGW and a BTS. In an LTE radio access domain, communication system 10 may use the S1-AP interface, which allows for signaling of QoS and policy information between an SGW and an eNodeB. In the transport domain, communication system 10 may use other existing protocols, such as E-LMI and Y.1731 performance management functions, along with pending MEF-20 auto-provisioning functions, for example.

In certain instances, communication system 10 can achieve any number of important advantages over existing architectures. For example, the architecture of FIG. 1 can be configured to enforce QoS based on overall system capacity, rather than airlink capacity, which generally allows for a better user experience and a more efficient use of available resources. Another potential advantage is the ability to dynamically adjust QoS in response to anomalous system conditions, such as an outage at a backhaul provider or inclement weather that affects microwave signal strength. Furthermore, under conditions where one or more AGWs may communicate with a single eNodeB over one congested access link, communication system 10 can enable an Agg-PE and AGW to accurately determine the guaranteed bitrate (GBR) available on a per-AGW basis, a per-subscriber basis, and a per-flow basis.

Returning to FIG. 1, UE 12a-c can be associated with clients or customers wishing to initiate a flow in communication system 10 via some network. The term 'user equipment' includes terminology such as 'mobile node', 'end user', 'and 'subscriber.' Additionally, the term user equipment (UE) is inclusive of devices used to initiate a communication, such as a computer, a personal digital assistant (PDA), a laptop or electronic notebook, a cellular telephone, an i-Phone, i-Pad, a Google Droid phone, an IP phone, or any other device, component, element, or object capable of initiating voice, audio, video, media, or data exchanges within communication system 10. UE 12a-c may also be inclusive of a suitable interface to a user such as a microphone, a display, a keyboard, or other terminal equipment.

UE 12a-c may also be any device that seeks to initiate a communication on behalf of another entity or element such as a program, a database, or any other component, device, element, or object capable of initiating an exchange within communication system 10. Data, as used herein in this document, refers to any type of numeric, voice, video, media, or script data, or any type of source or object code, or any other suitable information in any appropriate format that may be communicated from one point to another. In certain embodiments, UE 12a-c have a bundled subscription for network access and application services (e.g., voice), etc. Once the access session is established, the user can register for application services as well, without additional authentication requirements. There can be two different user data repositories (AAA databases): one for the access user profile and one for the application user profile. IP addresses can be assigned using dynamic host configuration protocol (DHCP), Stateless Address Auto-configuration, default bearer activation, etc., or any suitable variation thereof.

PCRF 36 is a network element responsible for coordinating charging and/or policy decisions for UE 12a-c. PCRF 36 can be configured to use subscription information as a basis for the policy and charging control decisions. The subscription information may apply for both session-based and non-session based services. PCRF 36 can maintain session linking to the sessions via policy interactions with PGW 14 (and possibly SGW 28) and application functions (e.g., provided as part of the operator's IP services). An application function (AF) can be provided within PCRF 36 (or simply interact with PCRF 36) in order to offer applications that require dynamic policy and/or charging control. The AF can communicate with PCRF 36 to transfer dynamic session information. Additionally, any type of policy and/or charging control element (e.g., PCC infrastructure) can be provided within (or suitably interact with) PCRF 36.

HSS 18 offers a subscriber database in 3GPP (e.g., GSM, LTE, etc.) environments. In one sense, HSS 18 can provide functions similar to those offered by an AAA server in a CDMA environment. When a user moves to 3GPP access, HSS 18 can be aware of this location and this anchor point (i.e., PGW 14). Additionally, HSS 18 can communicate with AAA element 24 such that when a UE moves to a CDMA environment, it still has an effective anchor for communications (i.e., PGW 14). HSS 18 and AAA element 24 can coordinate this state information for the UE (and synchronize this information) to achieve mobility. No matter how a UE moves, the access network element can be interacting with either HSS 18 or AAA element 24 in order to identify which PGW should receive the appropriate signaling. The route to a UE can be consistently maintained, where routing topology ensures that data is sent to the correct IP address. Thus, synchronization activity on the backend of the architecture allows mobility to be achieved for the user when operating in different environments. Additionally, in certain examples, PGW 14 performs home agent functions, and the trusted non-3GPP IP access network can provide packet data serving node (PDSN) functions in order to achieve these objectives.

AAA element 24 is a network element responsible for accounting, authorization, and authentication functions for UEs 12*a-c*. For the AAA considerations, AAA element 24 may provide the mobile node IP address and the accounting session identification (Acct-Session-ID) and other mobile node states in appropriate messaging (e.g., via an access-Request/access-Accept message). An accounting message can be sent for the following events: accounting-start when the IP session is initially created for the mobile node on the gateway; accounting-interim-update when a handover occurred between gateways; and an accounting-stop when the IP session is removed from the gateway serving the element. For roaming scenarios, the home routed case is fully supported by the architecture.

The EPC generally comprises an MME, an SGW, a PGW, and a PCRF. The MME is the primary control element for the EPC. Among other things, MME 40 is configured to provide tracking area list management, idle mode UE tracking, bearer activation and deactivation, SGW and PGW selection for UEs, and authentication services. The SGW is a data plane element that can manage user mobility and interfaces with RANs. The SGW also can maintain the data paths between eNodeBs and the PGW, and serves as a mobility anchor when UEs move across areas served by different eNodeBs. The PGW provides connectivity for UEs to external packet data networks. The PCRF detects service flows and enforces charging policies.

RANs in an LTE architecture consist of eNodeBs (also known as eNBs). An eNodeB is generally connected directly to an EPC, as well as to adjacent eNodeBs. Connections with adjacent eNodeBs allow many calls to be routed more directly, often with minimal or no interaction with an EPC. An eNodeB is also responsible for selecting an MME for UEs, managing radio resources, and making handover decisions for UEs.

In operation, UE 12*a* can attach to the network for purposes of establishing a communication session. UE 12*a* can communicate with eNodeB 34, which can further interact with MME 40 to complete some form of authentication for a particular user. MME 40 can interact with SGW 28, which interacts with PGW 14 such that a session is being setup between these components. Tunnels could be established at this juncture, and a suitable IP address would also be issued for this particular user. This process generally involves a default EPS bearer being created for UE 12*a*. As the session is established, PGW 14 can interact with PCRF 36 to identify policies associated with this particular user, such as a certain QoS setting, bandwidth parameter, latency setting, priority, billing, etc.

Figure 2:
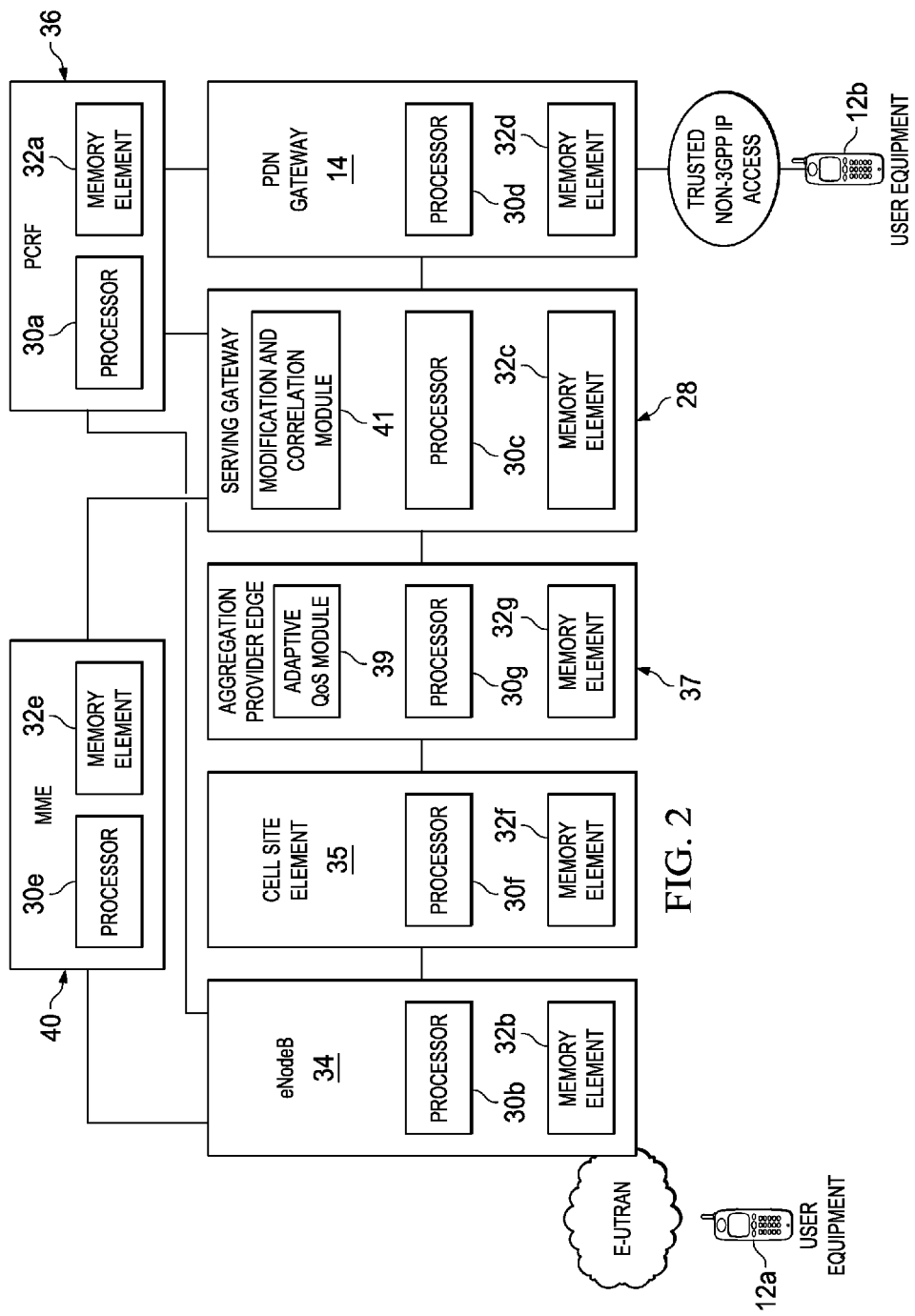
FIG. 2 is a simplified block diagram illustrating additional details associated with one potential embodiment of the communication system.

Turning to FIG. 2, FIG. 2 is a simplified block diagram illustrating additional details associated with one potential embodiment of communication system 10. FIG. 2 includes PGW 14, SGW 28, eNodeB 34, cell site element 35, PCRF 36, Agg-PE 37, and MME 40. Each of these elements includes a respective processor 30*a-g* and a respective memory element 32*a-g*. SGW 28 includes a modification and correlation module 41, and Agg-PE 37 includes an adaptive QoS module 39. Hence, appropriate software and/or hardware is provisioned in SGW 28 and Agg-PE 37 to facilitate the activities discussed herein. Also depicted in FIG. 2 is UE 12*a-b*, which can attach to respective networks in order to conduct their communication sessions.

In one example implementation, PGW 14, SGW 28, eNodeB 34, cell site element 35, Agg-PE 37, and MME 40 are network elements, which are meant to encompass network appliances, servers, routers, switches, gateways, bridges, loadbalancers, firewalls, processors, modules, or any other suitable device, component, element, or object operable to exchange information in a network environment. Along similar lines, the term 'microwave device' is a type of network element, which is simply operating in conjunction with microwave protocols. Moreover, the network elements may include any suitable hardware, software, components, modules, interfaces, or objects that facilitate the operations thereof. This may be inclusive of appropriate algorithms and communication protocols that allow for the effective exchange of data or information.

In regards to the internal structure associated with communication system 10, each of PGW 14, SGW 28, eNodeB 34, cell site element 35, Agg-PE 37, and MME 40 can include memory elements (as shown in FIG. 2) for storing information to be used in achieving the congestion management operations, as outlined herein. Additionally, each of these devices may include a processor that can execute software or an algorithm to perform the activities discussed herein. These devices may further keep information in any suitable memory element [(e.g., random access memory (RAM), read only memory (ROM), an erasable programmable read only memory (EPROM), application specific integrated circuit (ASIC), etc.], software, hardware, or in any other suitable component, device, element, or object where appropriate and based on particular needs. Any of the memory items discussed herein should be construed as being encompassed within the broad term 'memory element.' The information being tracked or sent by PGW 14, SGW 28, eNodeB 34, cell site element 35, Agg-PE 37, and/or MME 40 could be provided in any database, queue, register, control list, or storage structure, all of which can be referenced at any suitable timeframe. Any such storage options may be included within the broad term 'memory element' as used herein. Similarly, any of the potential processing elements, modules, and machines described herein should be construed as being encompassed within the broad term 'processor.' Each of the network elements and user equipment (e.g., mobile nodes) can also include suitable interfaces for receiving, transmitting, and/or otherwise communicating data or information in a network environment.

In one example implementation, SGW 28 and/or Agg-PE 37 may include software to achieve, or to foster, QoS management operations outlined herein. In other embodiments, these operations may be provided externally to these elements, or included in some other network device to achieve this intended functionality. Alternatively, these elements include software (or reciprocating software) that can coordinate in order to achieve the QoS management operations, as outlined herein. In still other embodiments, one or all of these devices may include any suitable algorithms, hardware, software, components, modules, interfaces, or objects that facilitate the operations thereof.

Note that in certain example implementations, functions outlined herein may be implemented by logic encoded in one or more tangible media (e.g., embedded logic provided in an ASIC, in DSP instructions, software [potentially inclusive of object code and source code] to be executed by a processor, or other similar machine, etc.). In some of these instances, memory elements [as shown in FIG. 2] can store data used for the operations described herein. This includes the memory elements being able to store software, logic, code, or processor instructions that are executed to carry out the activities described herein. A processor can execute any type of instructions associated with the data to achieve the operations detailed herein. In one example, the processors [as shown in FIG. 2] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a digital signal processor (DSP), an EPROM, EEPROM) or an ASIC that includes digital logic, software, code, electronic instructions, or any suitable combination thereof.

Figure 3:
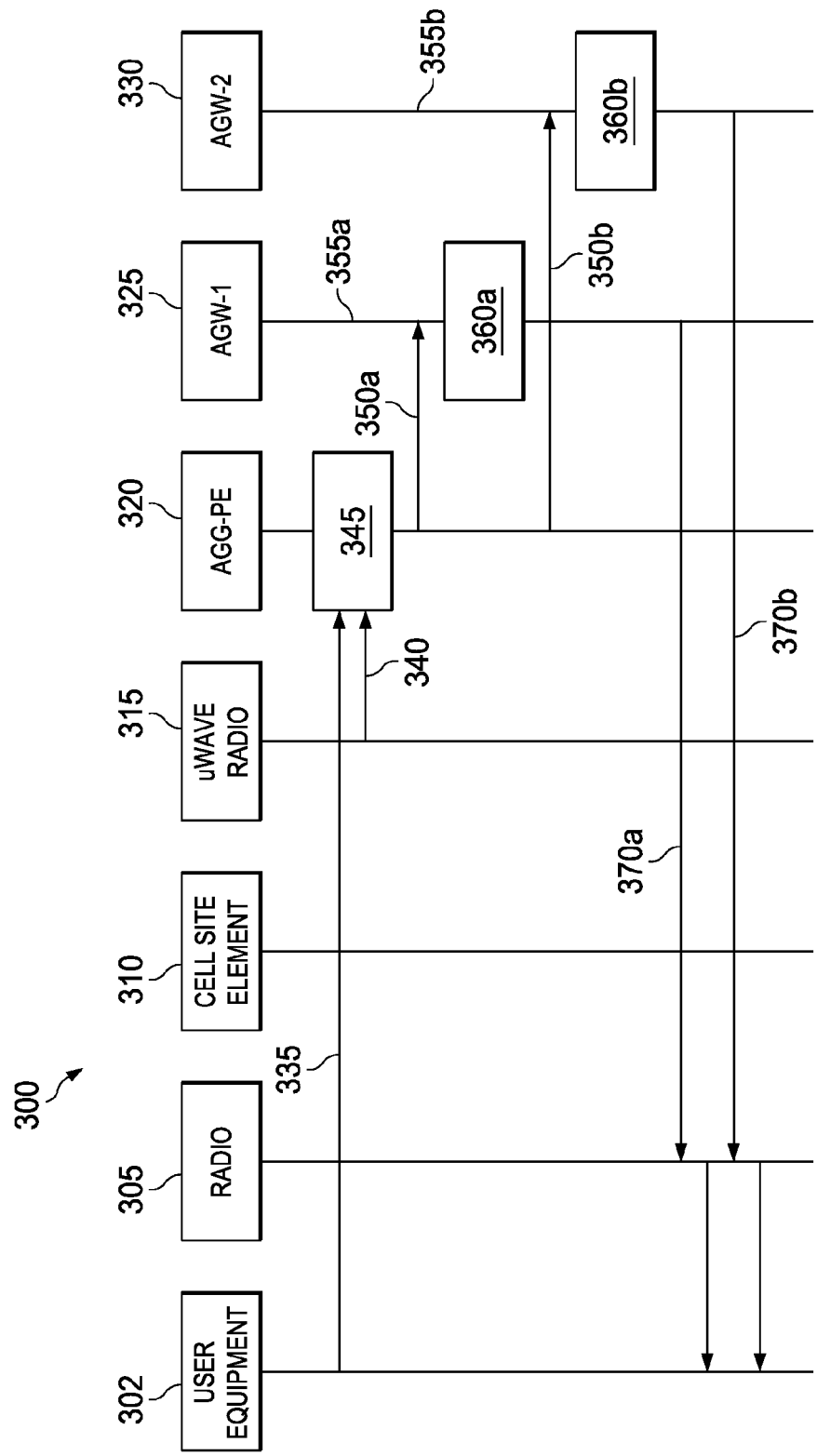
FIG. 3 is a simplified block diagram illustrating details associated with an example use case in particular implementations of the communication system.

Turning to FIG. 3, FIG. 3 is a simplified block diagram illustrating a use case 300 for an example embodiment of communication system 10. In this simplified diagram, communication system 10 includes UE 302, a radio 305, a cell site element 310, a microwave radio 315, an Agg-PE 320, AGW 325, and AGW 330. At 335, radio 305 may receive subscriber signals from UE 302, which can be routed through cell site element 310 over microwave radio 315 to Agg-PE 320. At 340, microwave radio 315 may signal bandwidth status to Agg-PE 320, which may, for example, indicate that microwave radio 315 is operating under constrained conditions.

Agg-PE 320 may receive these signals, identify bandwidth anomalies between UE 302 and Agg-PE 320, and aggregate bandwidth anomalies over additional links at 345. Agg-PE 320 may then send QoS control signals to AGW 325 and AGW 330 (at 350a and 350b, respectively). QoS control signals may include, for example, a signal indicating congestion, performance degradation, and/or the link rate between UE 302 and Agg-PE 320. At 355a and 355b, AGW 325 and AGW 330 may receive the respective QoS control signals from Agg-PE 320, as well as other Agg-PEs. At 360a and 360b, AGW 325 and AGW 330 can correlate QoS control signals from multiple Agg-PEs. AGW 325 and AGW 330 may then translate the QoS control signals and modify GBR flows at 370a-b, respectively.

Note that the term 'bandwidth anomaly' as used herein in this Specification is a broad term that is meant to encompass any type of fluctuation in the network (e.g., inclusive of fluctuations at the link level, at the network device level, at the broader network level, etc.), and, further, it encompasses any type of characteristic or data segment associated with link rate, latency, interference, noise, packet loss, delay, QoS, errors, subscriber mobility, priority, or any other suitable characteristic that may have some relationship to bandwidth. Status signals may be used to detect such bandwidth anomalies, where the 'status signals' as used herein in this Specification may involve any type of detection algorithm and, further, inclusive of any type of metric being sent from other network elements, or inherently known parameters (or recently discovered parameters), or learned parameters: any of which can be used to detect (e.g., inclusive of infer, presume, determine, identify, etc.) bandwidth anomalies.

Figure 4:
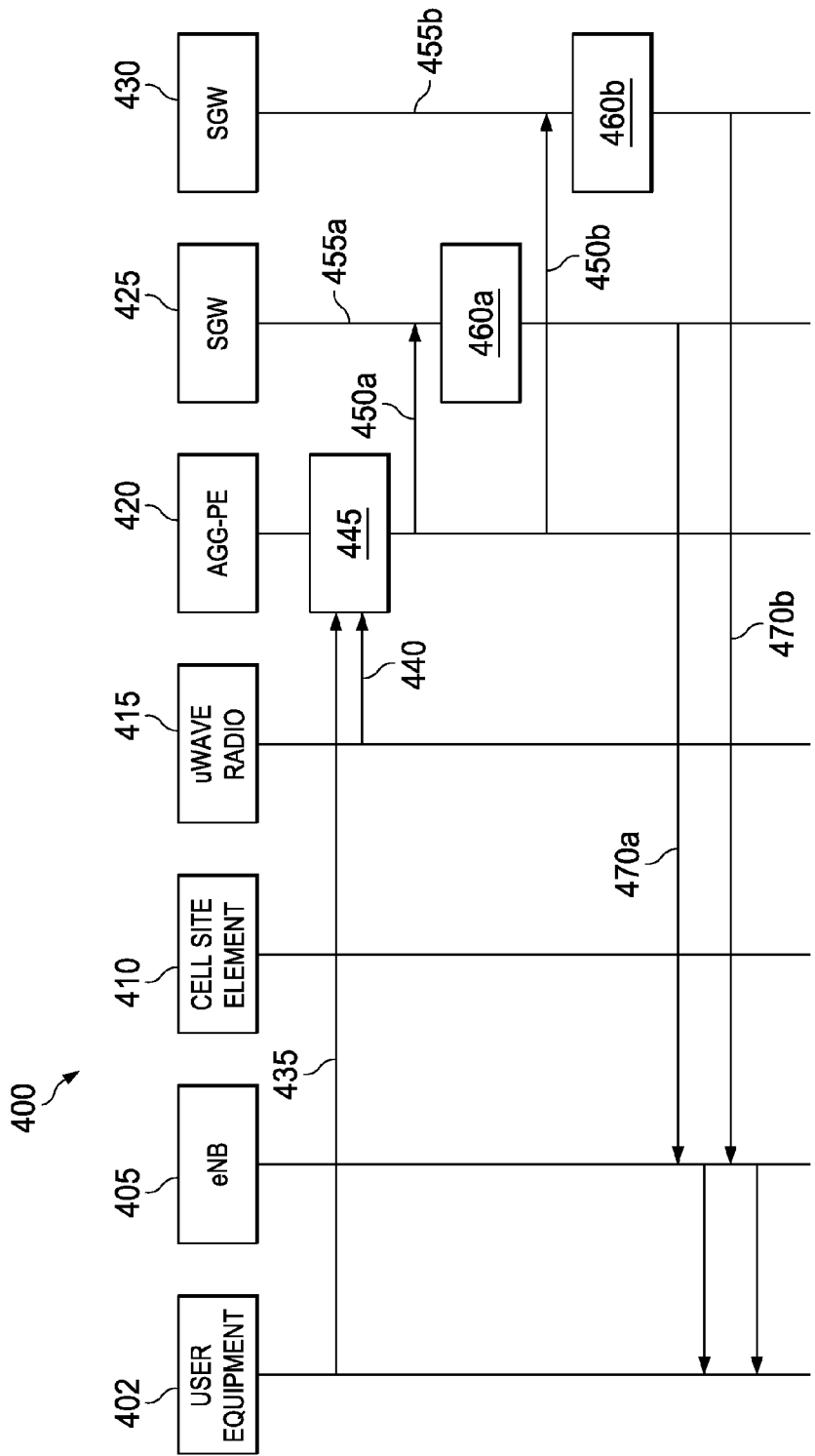
FIG. 4 is a simplified block diagram illustrating details associated with example use cases in a particular implementation of the communication system for an LTE architecture.

FIG. 4 is a simplified block diagram illustrating a use case 400 for an example embodiment of communication system 10 implemented for an LTE architecture. In this simplified diagram, communication system 10 includes UE 402, an eNodeB 405, a cell site element 410, a microwave radio 415, and Agg-PE 420, SGW 425, and SGW 430. At 435, eNodeB 405 may receive subscriber signals from UE 402, which can be routed through cell site element 410 over microwave radio 415 to Agg-PE 420. At 440, microwave radio 415 may signal bandwidth status to Agg-PE 420, which may, for example, indicate that microwave radio 415 is operating under constrained conditions. Agg-PE 420 may receive these signals, identify bandwidth anomalies between UE 402 and Agg-PE 420, and aggregate bandwidth anomalies over additional links at 445.

Agg-PE 420 may then send QoS control signals to SGW 425 and SGW 430 at 450a and 450b, respectively. QoS control signals may include, for example, a signal indicating congestion, performance degradation, and/or the link rate between UE 402 and Agg-PE 420. At 455a and 455b, SGW 425 and SGW 430 may receive the respective QoS control signals from Agg-PE 420, as well as other Agg-PEs. At 460a and 460b, SGW 425 and SGW 430 can correlate QoS control signals from multiple Agg-PEs. SGW 425 and SGW 430 may then translate the QoS control signals and modify GBR flows at 470a-b, respectively (e.g., via an S1-AP interface).

Figure 5:
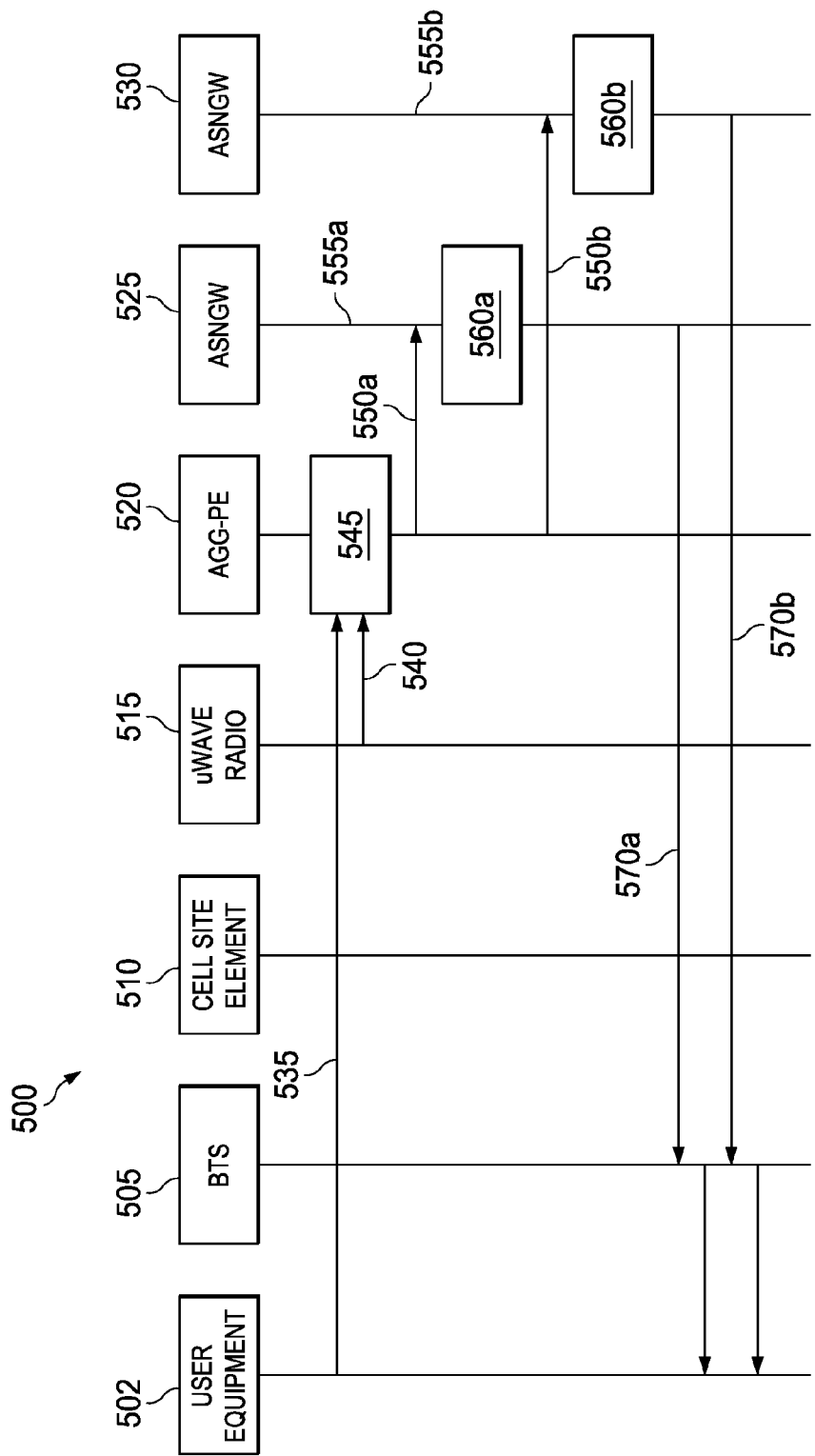
FIG. 5 is a simplified block diagram illustrating details associated with example use cases in a particular implementation of the communication system for a WiMAX architecture.

FIG. 5 is a simplified block diagram illustrating a use case 500 for an example embodiment of communication system 10 implemented in a WiMAX architecture. In this simplified diagram, communication system 10 includes UE 502, a BTS 505, a cell site element 510, a microwave radio 515, and Agg-PE 520, ASNGW 525, and ASNGW 530. At 535, BTS 505 may receive subscriber signals from UE 502, which can be routed through cell site element 510 over microwave radio 515 to Agg-PE 520. At 540, microwave radio 515 may signal bandwidth status to Agg-PE 520, which may, for example, indicate that microwave radio 515 is operating under constrained conditions. Agg-PE 520 may receive these signals, identify bandwidth anomalies between UE 502 and Agg-PE 520, and aggregate bandwidth anomalies over additional links at 545. Agg-PE 520 may then send QoS control signals to ASNGW 525 and ASNGW 530 at 550a and 550b, respectively. QoS control signals may include, for example, a signal indicating congestion, performance degradation, and/or the link rate between UE 502 and Agg-PE 520. At 555a and 555b, ASNGW 525 and ASNGW 530 may receive the respective QoS control signals from Agg-PE 520, as well as other Agg-PEs. At 560a and 560b, ASNGW 525 and ASNGW 530 can correlate QoS control signals from multiple Agg-PEs. ASNGW 525 and ASNGW 530 may then translate the QoS control signals and modify GBR flows at 570a-b, respectively (e.g., via an R6 interface).

Note that with the examples provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures. Additionally, although described with reference to particular scenarios, where a module (e.g., an adaptive QoS module and/or modification and correlation module 41) is provided within the network elements, these elements can be provided externally, or consolidated and/or combined in any suitable fashion. In certain instances, certain elements may be provided in a single proprietary module, device, unit, etc.

It is also important to note that the steps in the appended diagrams illustrate only some of the possible signaling scenarios and patterns that may be executed by, or within, communication system 10. Some of these steps may be deleted or removed where appropriate, or these steps may be modified or changed considerably without departing from the scope of teachings provided herein. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings provided herein.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method implemented by a microwave device, the method comprising:
   receiving a status signal, for a radio link, at the microwave device, the status signal using Metro Ethernet Forum signaling, wherein the radio link is an Ethernet microwave backhaul link terminating at the microwave device;
   detecting a bandwidth anomaly based on the status signal, wherein the bandwidth anomaly indicates a reduced bandwidth over the Ethernet microwave backhaul link; and
   communicating a quality of service (QoS) control signal, which is based on the bandwidth anomaly, to a gateway.

2. The method of claim 1, wherein link rate information is communicated to a network element that serves as a point of attachment to an Internet protocol (IP) network.

3. The method of claim 1, wherein the status signal is received using a Metro Ethernet Forum User Network Interface.

4. The method of claim 1, wherein the QoS control signal is communicated using an Access Node Control Protocol.

5. The method of claim 1, further comprising:
   receiving a status signal having a QoS modified based on the QoS control signal.

6. The method of claim 2, wherein the QoS control signal includes the link rate information.

7. Logic encoded in non-transitory media that includes code for execution and, when executed by a processor, operable to perform operations comprising:
   receiving a status signal, for a radio link, the status signal using Metro Ethernet Forum signaling, wherein the radio link is an Ethernet microwave backhaul link terminating at a device including the processor;
   detecting a bandwidth anomaly based on the status signal, wherein the bandwidth anomaly indicates a reduced bandwidth over the Ethernet microwave backhaul link; and
   communicating a quality of service (QoS) control signal, which is based on the bandwidth anomaly, to a gateway.

8. The logic of claim 7, wherein link rate information is communicated to a network element that serves as a point of attachment to an Internet protocol (IP) network.

9. The logic of claim 7, wherein the status signal is received using a Metro Ethernet Forum User Network Interface.

10. The logic of claim 7, wherein the QoS control signal is communicated using an Access Node Control Protocol.

11. The logic of claim 7, the operations further comprising:
    receiving a status signal having a QoS modified based on the QoS control signal.

12. The logic of claim 8, wherein the QoS control signal includes the link rate information.

13. An apparatus, comprising:
    a memory element configured to store electronic code; and
    a processor operable to execute instructions associated with the electronic code to receive a status signal, for a radio link, to detect a bandwidth anomaly based on the status signal, and to communicate a QoS control signal, which is based on the bandwidth anomaly, to a gateway, the status signal using Metro Ethernet Forum signaling, the radio link being an Ethernet microwave backhaul link terminating at the apparatus, the bandwidth anomaly indicating a reduced bandwidth over the Ethernet microwave backhaul link.

14. The apparatus of claim 13, wherein link rate information is communicated to a network element that serves as a point of attachment to an Internet protocol (IP) network.

15. The apparatus of claim 13, wherein the status signal is received using a Metro Ethernet Forum User Network Interface.

16. The apparatus of claim 13, wherein the QoS control signal is communicated using an Access Node Control Protocol.

17. The apparatus of claim 13, wherein the apparatus receives a status signal having a QoS modified based on the QoS control signal.

18. The apparatus of claim 14, wherein the QoS control signal includes the link rate information.

* * * * *